United States Patent
Ludwig et al.

(10) Patent No.: US 7,698,050 B2
(45) Date of Patent: Apr. 13, 2010

(54) METHOD AND DEVICE FOR CONTROLLING A DRIVE UNIT

(75) Inventors: Martin Ludwig, Valhingen (DE); Ruprecht Anz, Lehrensteinsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 11/665,045

(22) PCT Filed: Oct. 7, 2005

(86) PCT No.: PCT/EP2005/055109

§ 371 (c)(1),
(2), (4) Date: Nov. 21, 2008

(87) PCT Pub. No.: WO2006/040302

PCT Pub. Date: Apr. 20, 2006

(65) Prior Publication Data

US 2009/0070018 A1    Mar. 12, 2009

(30) Foreign Application Priority Data

Oct. 8, 2004    (DE)    ............ 10 2004 049 345

(51) Int. Cl.
*B60T 7/12* (2006.01)
*F02D 1/00* (2006.01)

(52) U.S. Cl. .................. 701/104; 701/112; 123/319

(58) Field of Classification Search ............. 701/101, 701/103, 104, 110, 112; 123/319, 320, 325, 123/326, 332, 481
See application file for complete search history.

(56) References Cited

U.S. PATENT DOCUMENTS

| | | | | |
|---|---|---|---|---|
| 4,353,342 | A | | 10/1982 | Sugasawa et al. |
| 4,667,633 | A | * | 5/1987 | Stumpp et al. ............. 123/357 |
| 5,265,693 | A | * | 11/1993 | Rees et al. ................. 180/197 |
| 5,992,382 | A | * | 11/1999 | Bruedigam et al. ......... 123/396 |
| 6,373,144 | B2 | * | 4/2002 | Frohlich et al. ........... 290/40 R |
| 6,434,466 | B1 | | 8/2002 | Robichaux et al. |
| 6,763,815 | B2 | * | 7/2004 | Gerhardt et al. ............ 123/609 |
| 7,006,910 | B2 | * | 2/2006 | Schuricht et al. ........... 701/105 |
| 2001/0002090 | A1 | * | 5/2001 | Frohlich et al. ........... 290/40 R |
| 2005/0022789 | A1 | * | 2/2005 | Palma et al. ............... 123/435 |

FOREIGN PATENT DOCUMENTS

| | | |
|---|---|---|
| EP | 1076165 A2 | 2/2001 |
| EP | 1085781 A2 | 3/2001 |

* cited by examiner

*Primary Examiner*—John T Kwon
(74) *Attorney, Agent, or Firm*—Kenyon & Kenyon LLP

(57) ABSTRACT

A method and a device for controlling a drive unit are provided, which allow for a reproducible load reversal damping. For this purpose, a setpoint value for an output variable of the drive unit is limited so that an overrun fuel cutoff of the drive unit is prevented. A limiting value for the setpoint value for the output variable is formed as a function of a loss value of the drive unit.

10 Claims, 1 Drawing Sheet

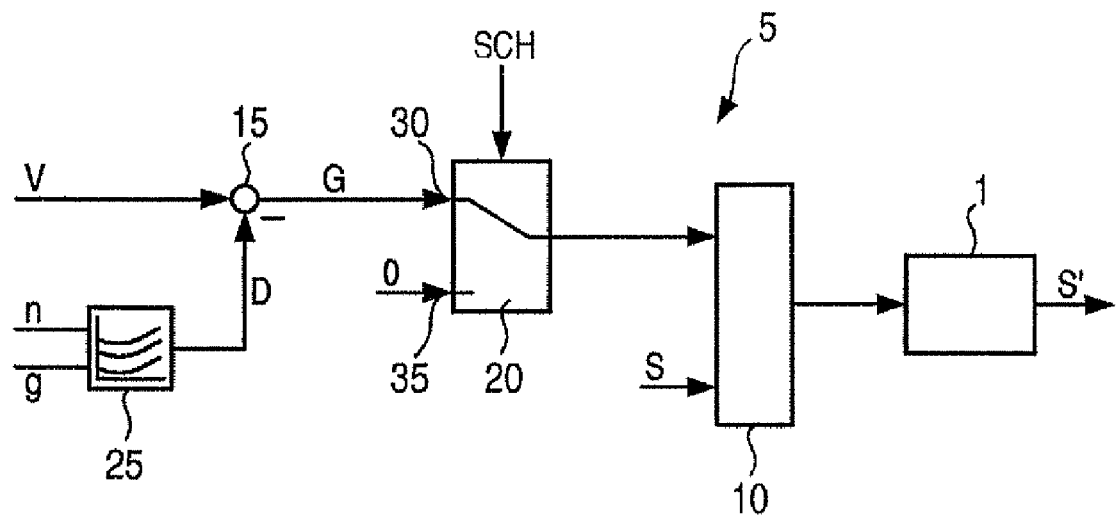
Fig. 1
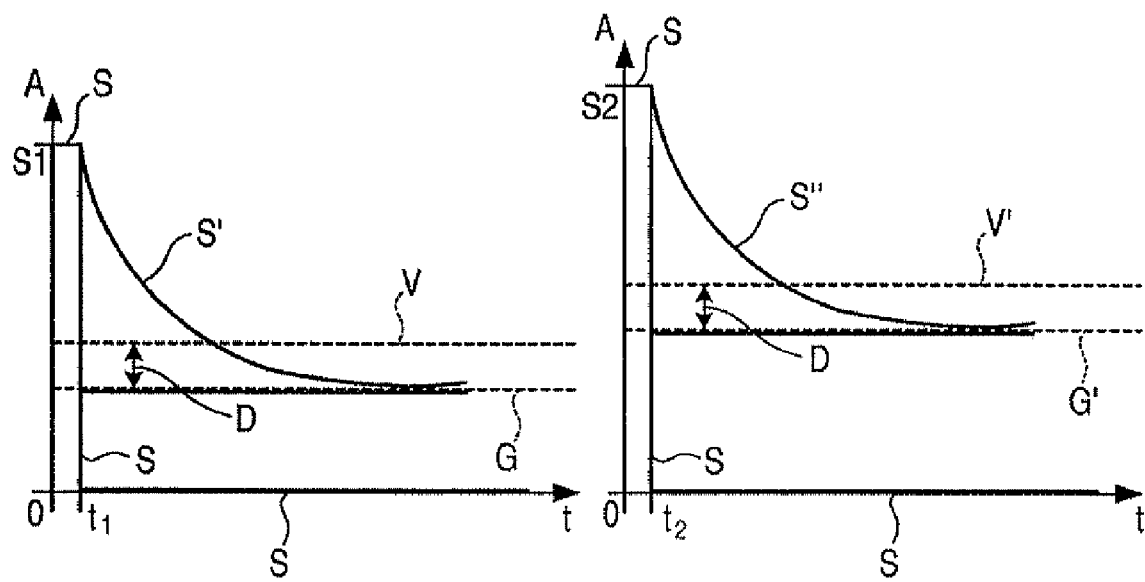
Fig. 2 a) b)

METHOD AND DEVICE FOR CONTROLLING A DRIVE UNIT

FIELD OF THE INVENTION

The present invention is directed to a method and a device for controlling a drive unit.

BACKGROUND INFORMATION

Methods and devices for controlling a drive unit are already known, in which a setpoint value for an output variable of the drive unit is limited in such a way that an overrun fuel cutoff of the drive unit is prevented. If the driver of a vehicle releases the accelerator pedal at an engine speed that is greater than the idling speed, then he normally desires a deceleration of the vehicle by the drag torque of the engine including the operation of ancillary components of the vehicle. For the transition from an acceleration condition to an overrun condition of the vehicle, a setpoint value for the engine torque is filtered so that the vehicle is not decelerated too abruptly and no abrupt load reversal ensues. In this manner, a load reversal damping is implemented. Normally, what is to be achieved thereby is that following the filtering all cylinders of the internal combustion engine of the vehicle are cut off.

The cutoff in this instance, however, is enabled only after a torque threshold value has been reached near or equal to the zero torque if the engine speed still exceeds the predefined idling speed by more than a predefined threshold value. This cylinder cutoff is also known as an overrun fuel cutoff. Often a cutoff of the cylinders is not possible for reasons that do not depend on the formation of the threshold value for the engine torque, for example in order to ensure a tank ventilation or a sufficient catalytic converter temperature or if the engine speed is close to the idling setpoint speed.

For filtering the setpoint value of the engine torque, in this case a minimum torque greater than zero is predefined as the target value, which lies in the range of the drag torque. This is to prevent the output torque of the filter from falling below a clutch zero torque at all or from falling below a clutch zero torque at an excessively steep time gradient. The clutch zero torque is in this instance equal to a torque loss.

This approach is problematic in that the behavior of the vehicle during a load reversal, i.e. during the transition from the acceleration condition into the overrun condition is not reproducible since the distance of the minimum torque from the clutch zero torque differs as a function of the clutch zero torque or of the torque loss.

SUMMARY OF THE INVENTION

By contrast, the method according to the present invention and the device according to the present invention for controlling a drive unit having the features of the independent claims have the advantage that a limiting value is formed for the setpoint value for the output variable as a function of a loss value of the drive unit. This ensures that the distance of the limiting value for the setpoint value for the output variable from the loss value of the drive unit remains constant, no matter how the great is the loss value. Thus it is possible to achieve the load reversal damping in a reproducible manner independently of the magnitude of the loss value if the setpoint value for the output variable is to be withdrawn and an overrun fuel cutoff is not enabled.

The measures set forth in the dependent claims make possible advantageous further developments and improvements of the method indicated in the main claim.

It is particularly advantageous if for forming the limiting value a predefined value is added to the loss value or a predefined value is subtracted from the loss value. This allows for a particularly simple and reliable implementation for forming the limiting value.

Another advantage results if the limiting value is formed as a function of an operating state of the drive unit. In this manner it is possible to adapt the load reversal damping to the operating state of the drive unit, the distance of the loss value from the limiting value nevertheless remaining constant for identical operating states of the drive unit, and thus in an identical operating state of the drive unit the behavior of the drive unit in a load reversal or the load reversal damping can be achieved in a reproducible manner.

It is furthermore advantageous if the operating state is determined as a function of a transmission ratio, a gear and/or a rotational speed. In this manner it is possible to determine the respective operating state of the drive unit in a simple and reliable manner and to adapt the limiting value thus optimally to the respective operating state of the drive unit in the sense of an optimum load reversal damping while preventing an abrupt load reversal as much as possible.

It is furthermore advantageous if the setpoint value for the output variable is filtered, in particular using a low pass filter, and if the limiting value is chosen as the target value of the filtering. In this manner it is possible to combine in a simple manner the load reversal damping optimally with the selection of the suitable limiting value for the setpoint value for the output variable in order to achieve the prevention of the abrupt load reversal in a reproducible manner.

An exemplary embodiment of the present invention is represented in the drawing and explained in greater detail in the following description.

BRIEF DESCRIPTION OF THE DRAWINGS

FIG. 1 shows a flow chart for explaining the method according to the present invention and the device according to the present invention.

FIG. 2a shows a first time characteristic of an output variable of a drive unit.

FIG. 2b shows a second time characteristic of the output variable of the drive unit.

DETAILED DESCRIPTION

In FIG. 1, 5 indicates a device according to the present invention in the form of a flow chart, which may be implemented, for example, by way of software and/or hardware in a control unit of a drive unit. In this instance, the drive unit may drive a motor vehicle, for example, and for this purpose may for example include a combustion engine. The combustion engine may be, for example, a spark-ignition engine or a diesel engine. In the case of the motor vehicle, the driver of the motor vehicle, for example, predefines a setpoint value for an output variable of the drive unit, for example, on an accelerator pedal by a suitable actuation. The output variable of the drive unit may be for example a torque or a power output or a variable derived from the torque and/or power output. In the following it is assumed by way of example that the output variable is a torque of the drive unit, for example, an engine torque. What is now considered is the transition from an acceleration condition into an overrun condition of the drive unit, which is achieved, for example, in that the driver releases the accelerator pedal of the vehicle. The setpoint value for the engine torque then jumps from a higher value to a lower value. This may be gathered, for example, from FIG. 2a), which represents the time characteristic of output variable A. As described, in this example, output variable A is the engine torque of the drive unit.

At a first time $t_1$, setpoint value S jumps from a positive value S to the value 0 due to the fact that the driver releases the accelerator pedal completely. In this manner, a transition is initiated from an acceleration condition to an overrun condition of the drive unit. So that the vehicle does not decelerate too abruptly due to the setpoint value jump at first time $t_1$ and that no abrupt load reversal occurs due to a contact change reaction of the bearings in the drive train of the vehicle, setpoint value S is filtered beginning from first time $t_1$, for example using a low pass filter, as indicated by reference numeral 1 in flow chart 5 of FIG. 1. If the driver, as described, abruptly releases the accelerator pedal, then he normally desires a deceleration of the vehicle by a drag torque of the engine including the operation of ancillary components such as, for example, air conditioning system, servo motors etc. The drag torque of the engine in this instance corresponds maximally to a loss value V in FIG. 2a), which combines all engine losses and is also called the torque loss in this example. Torque loss V in this context is also referred to as the clutch zero torque.

The range of the engine torque between the value 0 and torque loss V thus indicates the so-called overrun condition of the engine, in which the vehicle is driven by the drag torque of the engine, the corresponding drag torque being required for compensating the engine losses, for example due to the engine temperature, as well as for operating the ancillary components. Torque loss V includes the losses of the engine, which result for example as a function of the engine temperature, and the torque requirement of the ancillary components active on the clutch of the drive unit. The acceleration condition obtains for engine torques above the torque loss V and the overrun condition or the overrun fuel cutoff of the engine obtains for engine torques below the value 0. The overrun fuel is thus enabled only after a torque threshold value has been reached near or equal to the zero torque if the engine speed exceeds a predefined idling speed by at least a predefined threshold value.

In this manner, the engine is prevented from stalling in an overrun condition, it being possible suitably to apply the predefined threshold value, for example, on a test stand so as to cancel the overrun fuel cutoff in time and thus to prevent the engine speed from being able to fall below the predefined idling speed and the engine possibly to stall as a result. The overrun fuel cutoff in this instance signifies the blank-out of fuel for all cylinders of the combustion engine. However, an interruption of the fuel supply of the cylinders and thus an overrun fuel cutoff is often not possible for reasons that do not depend on the formation of setpoint value S. The continued supply of fuel to the cylinders in this context may be required, for example, for functions such as tank ventilation and for maintaining a predefined catalytic converter temperature.

In these cases, filter 1 is provided with a limiting value C as a target value, which is greater than 0 and which filtered setpoint value S' on the output of filter 1 approaches asymptotically. In this instance, limiting value G may lie in the range of the overrun condition, that is, be smaller than torque loss V and thus represent a drag torque. By a suitable choice of the limiting value G, for example, on a test stand, it is thus possible to prevent filtered setpoint value S' from passing clutch zero torque V at an excessively steep time gradient. If the limiting value G is selected to be greater than torque loss V, then this can prevent filtered setpoint value S' from falling below the clutch zero torque at all, and an abrupt load reversal is prevented by the fact that no contact change occurs in the bearings. The limiting value G greater than 0 ensures that filtered setpoint value S' does not enter the range of the overrun fuel cutoff, thus preventing an overrun fuel cutoff.

The exemplary embodiments and/or exemplary methods of the present invention now provides for limiting value G to be formed as a function of torque loss V of the drive unit. In this manner, torque loss V and limiting value G are linked in such a way that even in the case of different torque losses V the behavior of the vehicle is reproducible while preventing the abrupt load reversal by load reversal damping using setpoint value filtering and formation of the filtered setpoint value S'. By predefining limiting value G as target value for low pass filter 1 it is thus possible to prevent the abrupt load reversal in a reproducible manner regardless of the magnitude of torque loss V, in particular when the driver releases the accelerator pedal and a overrun fuel cutoff is not to be enabled.

This may be implemented in a particularly simple manner if for the formation of limiting value C a first predefined value is added to torque loss V or a second predefined value is subtracted from the torque loss. The first predefined value and the second predefined value may be equal of may differ. In the example shown in FIG. 2a), the predefined positive value D is subtracted from torque loss V in order to form limiting value G. FIG. 2b) shows the characteristic curve of output variable A over time for an example in which setpoint value S at a second time $t_2$ jumps from a second value $S_2$, which is greater than first value $S_1$, to the value zero. As shown in FIG. 2b), a torque loss V' exists in this instance, which is greater than torque loss V in FIG. 2a). The distance of torque loss V' in FIG. 2b) from second value $S_2$ is in this instance equal to the distance of torque loss V from first value S in FIG. 2a). According to FIG. 2a), limiting value G results from subtracting fixedly predefined value D from torque loss V. This fixedly predefined value D is also subtracted from torque loss V' as shown in FIG. 2b) such that a limiting value G' results there, which is equally distant from torque loss V' as limiting value G is from torque loss V in FIG. 2a).

As shown in FIG. 2b), limiting value G' is then the target value of low pass filter 1. Thus filtered setpoint value S" in FIG. 2b) approaches limiting value G' asymptotically from greater values. As shown in FIG. 2b), this results in a characteristic curve of filtered setpoint value S", which corresponds to characteristic curve S' of FIG. 2a), filtered setpoint values S' and S" in particular falling below the clutch zero torque at the same time gradients. In this manner, the load reversal damping has become reproducible. Thus a reproducible characteristic curve of filtered setpoint value S' or S" results irrespective of the magnitude of the torque loss V, V' in the range of the clutch zero torque passage. The varying magnitude of the torque losses V, V' may come about, for example, in that in one case, as shown in FIG. 2a), fewer ancillary components are connected than in the other case, as shown in FIG. 2b). The more ancillary components are connected, the greater is the torque loss.

Filtered setpoint value S' or S" may be formed with the aid of the flow chart shown in FIG. 5. For this purpose, as shown in FIG. 1, the formation of filtered setpoint value S', as shown in FIG. 2a, is described, the underlying circuit having to be used in a corresponding manner for forming filtered setpoint value S" as shown in FIG. 2b). Predefined value D, which is derived by a characteristics map 25, applied for example on a test stand, as a function of engine speed n and engaged gear g of the drive unit, is subtracted from torque loss V in a subtraction element 15. Predefined value D may be alternatively ascertained using a characteristics map as a function of engine speed n and a transmission ratio Ü of the drive unit. In addition, for ascertaining predefined value D, the ambient pressure of the drive unit may also be taken into account as an input value of characteristics map 25. On the output of subtraction element 15, limiting value G is then produced, which is supplied to a first input 30 of a controlled switch 20, whose second input 35 is supplied with the value zero. Subtraction element 15 thus represents a formation unit for forming limiting value G as a function of torque loss V. Controlled switch 20 is triggered by an overrun fuel cutoff signal SCH.

If the conditions for enabling the overrun fuel cutoff are all fulfilled, then overrun fuel cutoff signal SCH is set and brings about the connection between second input 35 of switch 20 and the output of switch 20. Otherwise overrun fuel cutoff signal SCH is set back and brings about the connection between first input 30 of switch 20 and the output of switch 20. The output of switch 20 is then supplied to a maximum selection element 10, which is also supplied with setpoint value S. Maximum selection element 10 selects the maximum from the output value of switch 20 and setpoint value S and supplies it as an input variable to low pass filter 1, which outputs filtered setpoint value S'.

Thus, starting from first time $t_1$ in FIG. 2a) or from second time $t_2$ in FIG. 2b), the drive unit does not implement setpoint value S, but rather setpoint value S' or S".

Torque loss V or V', engine speed n, gear g, transmission ratio Ü of the drive unit and the ambient pressure may be ascertained in a manner known to one skilled in the art. Setpoint value S, for example, results in a manner known to one skilled in the art from the degree of actuation of the accelerator pedal and corresponds to a driver's requested torque. Additionally or alternatively, the formation of setpoint value S may also be based, in a manner known to one skilled in the art, on other torque requests from other vehicle functions such as, for example, a traction control system, an antilock braking system, a dynamic directional stability system, a vehicle speed controller etc.

By suitably populating characteristics map 25 with data, predefined value D may also be negative such that limiting value G may also be greater than torque loss V. In this case, the vehicle possibly no longer decelerates, which may be tolerated, however, when the operating range of the drive unit is close to idling.

Engine speed n, engaged gear g, transmission ratio Ü of the drive unit and/or the ambient pressure, which may be supplied as input value to characteristics map 25 individually or in any combination, define an operating state of the drive unit such that predefined value D and thus limiting value G is formed as a function of the operating state of the drive unit. Thus it is possible to perform the load reversal damping for different operating states of the drive unit in each case in a reproducible manner.

What is claimed is:

1. A method for controlling a drive unit, the method comprising:
   forming a limiting value for a setpoint value for an output variable as a function of a loss value of the drive unit; and
   using the limiting value to limit the setpoint value for the output variable of the drive unit so that an overrun fuel cutoff of the drive unit is prevented;
   wherein in forming the limiting value, one of the following is performed: (i) a predefined value is added to the loss value; and (ii) the predefined value is subtracted from the loss value.

2. The method of claim 1, wherein the limiting value is formed as a function of an operating state of the drive unit.

3. The method of claim 2, wherein the operating state is determined as a function of at least one of a transmission ratio, a gear speed and a rotational speed.

4. The method of claim 1, wherein the setpoint value for the output variable is filtered, and the limiting value is chosen as the target value of the filtering.

5. A device for controlling a drive unit, comprising:
   a limiting unit to limit, to a limiting value, a setpoint value for an output variable of the drive unit so that an overrun fuel cutoff of the drive unit is prevented; and
   a formation unit to form the limiting value for the setpoint value for the output variable as a function of a loss value of the drive unit;
   wherein in forming the limiting value, one of the following is performed: (i) a predefined value is added to the loss value; and (ii) the predefined value is subtracted from the loss value.

6. The device of claim 5, wherein the limiting value is formed as a function of an operating state of the drive unit.

7. The device of claim 6, wherein the operating state is determined as a function of at least one of a transmission ratio, a gear speed and a rotational speed.

8. The device of claim 5, wherein the setpoint value for the output variable is filtered, and the limiting value is chosen as the target value of the filtering.

9. The device of claim 5, wherein the setpoint value for the output variable is low pass filtered, and the limiting value is chosen as the target value of the filtering.

10. The method of claim 1, wherein the setpoint value for the output variable is low pass filtered, and the limiting value is chosen as the target value of the filtering.

* * * * *